(12) United States Patent
Momose

(10) Patent No.: US 6,695,900 B2
(45) Date of Patent: *Feb. 24, 2004

(54) AQUEOUS INK COMPOSITION

(75) Inventor: Masayuki Momose, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 09/924,937

(22) Filed: Aug. 8, 2001

(65) Prior Publication Data

US 2002/0040660 A1 Apr. 11, 2002

(30) Foreign Application Priority Data

Aug. 9, 2000 (JP) .................. P.2000-241346
Aug. 9, 2000 (JP) .................. P.2000-241347

(51) Int. Cl.$^7$ .................. C09D 11/00
(52) U.S. Cl. .................. 106/31.75
(58) Field of Search .................. 106/31.75

(56) References Cited

U.S. PATENT DOCUMENTS 5,100,471 A    3/1992   Winnik et al. .......... 106/31.65
2002/0038614 A1 * 4/2002 Momose .................. 106/31.75

FOREIGN PATENT DOCUMENTS

| EP | 0635380 | 1/1995 |
|----|---------|--------|
| EP | 0802247 | 10/1997 |
| EP | 0819737 | 1/1998 |
| EP | 0985714 | 3/2000 |
| EP | 1035180 | 9/2000 |
| JP | 6264016 | 9/1994 |
| JP | 860053 | 3/1996 |

OTHER PUBLICATIONS

Abstract of JP06/264016 from Patent Abstracts of Japan, Sep. 1994.*
Derwent abstract of JP06/264016, Sep. 1994.*

* cited by examiner

*Primary Examiner*—Helene Klemanski
(74) *Attorney, Agent, or Firm*—Ladas & Parry

(57) ABSTRACT

An aqueous ink composition comprising at least: a surface-modified pigment capable of at least one of dispersing and dissolving in an aqueous solvent without use of a dispersant; an organic amine compound represented by formula (A) or (B) shown below; and water,

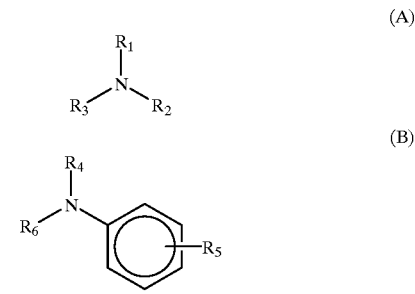

wherein $R_1$ to $R_6$ each independently represents a hydrogen atom or an alkyl or hydroxyalkyl chain having from 1 to 8 carbon atoms, which may have a branch, provided that at least one of $R_1$ to $R_3$ is an alkyl or hydroxyalkyl chain having from 3 to 8 carbon atoms, which may have a branch. Also disclose is an aqueous ink composition comprising at least a pigment, a dispersant, an organic amine compound represented by formula (A) or (B) shown below, a penetration accelerator and water.

9 Claims, No Drawings

AQUEOUS INK COMPOSITION

BACKGROUND OF THE INVENTION

1. Field of the Invention

The present invention relates to an aqueous ink having excellent ejection stability and when used as an ink for ink jet recording, free of occurrence of nozzle clogging.

2. Description of Related Art

The ink jet recording system is a system of obtaining a letter or an image by ejecting ink droplets from very fine nozzles directly to a recording medium and adhering these to the medium. In recent years, a multi-color printer is prevailing as an output apparatus of a personal computer and the like. According to the ink jet recording system, the multi-color printing can be easily performed and therefore, this recording system is rapidly popularized in various uses. The working principle thereof includes many systems such as deflection system, cavity system, thermo-jet system, bubble-jet system and thermal ink jet system. However, in any ink jet recording system, ink droplets must be continuously and stably ejected from fine nozzles. Accordingly, the ink for ink jet recording is required not only, similarly to normal ink, to provide a recording image having high quality, high fastness (e.g., water resistance, light fastness) and the like but also to ensure high ejection stability and no clogging of nozzles.

The ink for ink jet recording is in many cases an aqueous ink in view of its handleability, safety and the like. The aqueous ink can be roughly classified into a dye ink and a pigment ink. With respect to the dye ink, for example, JP-A-8-60053 (the term "JP-A" as used herein means an "unexamined published Japanese patent application") discloses a dye ink containing an organic amine such as tripropanolamine, and states that this ink has excellent ejection stability. On the other hand, the pigment ink has excellent image fastness as compared with the dye ink and it is demanded to develop an ink for ink jet recording by making good use of this property. However, the pigment ink is inferior to the dye ink in the ejection stability and has a problem in that clogging of nozzles readily occurs accompanying the precipitation and aggregation of the pigment. Therefore, improvement of the ejection stability of the pigment dye is a technical problem which must be solved by all means.

With an attempt to improve the ejection stability of pigment ink, for example, JP-A-6-264016 discloses an ink for ink jet recording, which comprises a pigment, a polymer dispersant, a water-soluble organic solvent, a drying inhibitor and two or more organic amines. This pigment ink comprises aminomethylpropanol which is an organic amine compound having a propanol skeleton capable of imparting excellent ejection stability, however, due to the action of the polymer dispersant, the defoamability may decrease to cause bubbling and in turn, the ejection stability may decrease. Furthermore, in the case of this pigment ink, when the pigment content is increased to elevate the printing density, the polymer dispersant content must be increased in proportion thereto, however, the polymer dispersant even in a small amount is liable to increase the viscosity of ink and therefore, cannot be contained in a large amount in the ink. From these reasons, this pigment ink cannot be so much increased in the pigment content, as a result, the printing density cannot be sufficiently elevated.

The pigment ink described in JP-A-6-264016 is so-called a slow penetration-type ink which is less wettable to paper due to its high surface tension, therefore, this ink has a problem in that the drying time is long. Furthermore, when this pigment ink is used for multi-color printing, ink droplets on the recording medium may be connected with each other in the boundary of different colors to cause mixing of colors called bleeding and incur reduction in the image quality. Thus, this pigment ink is not suitable for multi-color printing. In addition, this pigment ink cannot be applied to the printing on a non-absorptive recording medium such as OHP sheet and restricted in the range of recording mediums to which the pigment can be applied.

SUMMARY OF THE INVENTION

Accordingly, an object (object A) of the present invention is to provide an aqueous ink composition favored with excellent ejection stability almost free of bubbling, prevented from occurrence of nozzle clogging on use as a ink for ink jet recording, capable of satisfactorily elevating the printing density, and facilitated in the handling.

Another object (object B) of the present invention is to provide an aqueous ink composition favored with excellent ejection stability, prevented from occurrence of nozzle clogging on use as an ink for ink jet recording, reduced in the drying time, difficult of bleeding and broadened in the range of recording mediums to which the ink composition can be applied.

Other objects and effects of the present invention will be apparent from the following description.

As a result of extensive investigations on the aqueous ink composition, the present inventors have found that when a surface-modified pigment capable of dispersing and/or dissolving in an aqueous medium without use of a dispersant is used as a pigment together with an organic amine compound having a specific structure, an ink having excellent ejection stability almost free of bubbling and capable of being increased in the pigment content to a level of ensuring a sufficiently high printing density can be obtained (knowledge A).

The present invention has been made based on this knowledge A and the above-described object A can be attained by providing an aqueous ink composition comprising at least a surface-modified pigment capable of dispersing and/or dissolving in an aqueous medium without use of a dispersant, an organic amine compound represented by the following formula (A) or (B), and water (hereinafter referred to as the first invention).

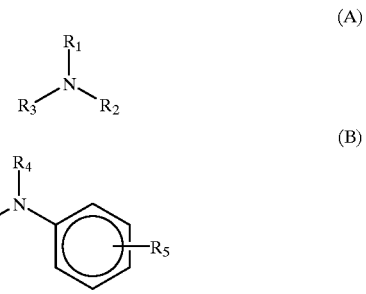

(wherein $R_1$ to $R_6$ each independently represents a hydrogen atom or an alkyl or hydroxyalkyl chain having from 1 to 8 carbon atoms, which may have a branch, provided that at least one of $R_1$ to $R_3$ is an alkyl or hydroxyalkyl chain having from 3 to 8 carbon atoms, which may have a branch).

Also, the present invention has been made as a result of extensive investigations to attain the above-described object B and provides an aqueous ink composition comprising a pigment, a dispersant, an organic amine compound represented by formula (A) or (B), a penetration accelerator, and water (hereinafter referred to as the second invention).

According to the aqueous ink composition of the first invention, excellent ejection stability is ensured with almost no bubbling and when used as an ink for ink jet recording, fear of nozzle clogging is eliminated. Furthermore, the aqueous ink composition of the first invention does not contain a dispersant and therefore, is facilitated in the handling, for example, the pigment content can be increased to a level of providing a sufficiently high printing density as compared with an ordinary pigment ink containing a dispersant.

According to the aqueous ink composition of the second invention, excellent ejection stability is ensured and when used as an ink for ink jet recording, fear of nozzle clogging is eliminated. Furthermore, the aqueous ink composition of the second invention can provide a high-quality printed matter reduced in the drying time and having almost no ink blurring, can be freed from fear of bleeding on use for multi-color printing and can be favored with a broad range of recording mediums to which the ink composition can be applied.

DETAILED DESCRIPTION OF THE INVENTION

The aqueous ink composition of the first invention is described in detail below.

The aqueous ink composition of the first invention contains a surface-modified pigment, an organic amine compound represented by formula (A) or (B) and water as essential components.

The surface-modified pigment contained in the aqueous ink composition of the first invention is a pigment capable of dispersing and/or dissolving in an aqueous medium without use of a dispersant. The term "dispersing and/or dissolving in an aqueous medium without use of a dispersant" as used herein means such a condition that a dispersoid (pigment) having a minimum particle size of allowing dispersion in an aqueous medium is stably present even without use of a dispersant. The term "dispersant" as used herein means an additive generally used for dispersing a pigment in an aqueous medium, such as surfactant or polymer material. Furthermore, the term "a minimum particle size of allowing dispersion" means a minimum particle size of a dispersoid, which is not reduced any more even when the dispersion time is increased.

The surface-modified pigment is obtained by bonding "a hydrophilic functional group and/or a salt thereof" (hereinafter referred to as "a dispersibility-imparting group") to the pigment surface. The dispersibility-imparting group may be bonded directly to the pigment surface or may be bonded through an alkyl group, an alkyl ether group or an aryl group.

The hydrophilic functional group is one or more member selected from the group consisting of a carboxyl group, a carbonyl group, a hydroxyl group, a sulfone group, a phosphoric acid group and a quaternary ammonium group.

Examples of the pigment which can be used as a starting material of the surface-modified pigment include carbon black, pigments described in Color Index, such as pigment yellow, pigment red, pigment violet, pigment blue and pigment black, pigments such as phthalocyanine-base pigment, azo-base pigment, anthraquinone-base pigment, azomethine-base pigment and condensed ring-base pigment, organic pigments such as Food Yellow 4, 5, 205 and 401, Food Orange 204, Food Red 104, 201, 202, 204, 220, 226 to 228 and 405, and Food Blue 1 and 404, and inorganic pigments such as titanium oxide, zinc oxide, zirconium oxide, iron oxide, ultramarine blue, Prussian blue and chromium oxide.

The surface-modified pigment is produced by physically or chemically treating a pigment and thereby bonding (grafting) the above-described dispersibility-imparting group or an active species having the dispersibility-imparting group to the surface of the pigment. Examples of the physical treatment include vacuum plasma treatment. Examples of the chemical treatment include a method of oxidizing a pigment surface with an oxidant in water and thereby directly bonding a carboxyl group or a sulfone group on the pigment surface, and a method of bonding a p-aminobenzoic acid to a pigment surface and thereby bonding a carboxyl group through a phenyl group.

From the standpoint of attaining storage stability of ink or preventing clogging of nozzles, the surface-modified pigment preferably has an average particle size of 1 to 300 nm, more preferably from 10 to 200 nm.

In the aqueous ink composition of the first invention, the surface-modified pigment is preferably contained in an amount of 1 to 30% by weight, more preferably from 3 to 10% by weight. If the content is less than 1% by weight, the printing density is not sufficiently high, whereas if it exceeds 30% by weight, increase of viscosity or on use as an ink for ink jet recording, clogging of nozzles may occur.

The organic amine compound represented by formula (A) or (B) contained in the aqueous ink composition of the first invention is an alkali agent used for adjusting the pH of the aqueous ink composition to a desired range (weak alkaline) and has a function of elevating the ejection stability.

In formulae (A) and (B), $R_1$ to $R_6$ each independently represents a hydrogen atom or an alkyl or hydroxyalkyl chain having from 1 to 8 carbon atoms, which may have a branch. Examples of the "alkyl chain having from 1 to 8 carbon atoms, which may have a branch" include a methyl group, an ethyl group, an isopropyl group and a tert-butyl group. Examples of the "hydroxyalkyl chain having from 1 to 8 carbon atoms, which may have a branch" include a hydroxymethyl group, a hydroxyethyl group, a hydroxyisopropyl group and a hydroxy-tert-butyl group.

However, in formula (A), at least one of $R_1$ to $R_3$ has 3 or more carbon atoms.

In formula (A), at least one of $R_1$ to $R_3$ is preferably a hydroxyalkyl chain in view of the water solubility of the organic amine compound represented by formula (A). Similarly, in formula (B), at least one of $R_4$ to $R_6$ is preferably a hydroxyalkyl chain.

Preferred examples of the organic amine compound represented by formula (A) include Compound Nos. 1 to 4 shown in Table 1 below.

TABLE 1

| | $R_1$ | $R_2$ | $R_3$ |
|---|---|---|---|
| Compound No. 1 | -n-$C_4H_9$ | —$CH_2CH_2OH$ | —$CH_2CH_2OH$ |
| Compound No. 2 | -tert-$C_4H_9$ | —$CH_2CH_2OH$ | —$CH_2CH_2OH$ |
| Compound No. 3 | —$C_3H_7$ | —$C_3H_7$ | —$CH_2CH_2OH$ |
| Compound No. 4 | -n-$C_4H_9$ | -n-$C_4H_9$ | —$CH_2CH_2OH$ |

Preferred examples of the organic amine compound represented by formula (B) include Compound Nos. 5 and 6 shown in Table 2 below.

TABLE 2

|  | $R_4$ | $R_5$ | $R_6$ |
|---|---|---|---|
| Compound No. 5 | —H | —CH$_2$CH$_2$OH | —CH$_2$CH$_2$OH |
| Compound No. 6 | —H | —H | —CH$_2$CH$_2$OH |

In the aqueous ink composition of the first invention, the organic amine compound represented by formula (A) or (B) is preferably contained in an amount of 0.01 to 5% by weight, more preferably from 0.05 to 2% by weight. If the content is less than 0.01% by weight, no effect is obtained on the ejection stability, whereas if it exceeds 5% by weight, the pH of the aqueous ink composition may not be adjusted to a desired range (which is described later).

The water contained in the aqueous ink composition of the first invention is a main solvent and pure water or ultrapure water, such as ion-exchange water, ultra-filtration water, reverse osmosis water and distilled water, may be used. Particularly, water subjected to a sterilization treatment, for example, under irradiation of an ultraviolet ray or by the addition of hydrogen peroxide is preferred from the standpoint of preventing generation of mold or bacteria and enabling long-term storage of the ink.

In the aqueous ink composition of the present invention, water is preferably contained in an amount of 30 to 90% by weight, more preferably from 40 to 80% by weight.

The aqueous ink composition of the first invention contains these components (a surface-modified pigment, an organic amine compound represented by formula (A) or (B) and water) and thereby can be favored with excellent ejection stability almost free of bubbling and with easy handleability, however, if desired, the aqueous ink composition may contain various components described below.

From the standpoint of elevating the penetration into a recording medium, the aqueous ink composition of the first invention further preferably contains a penetration accelerator. For the penetration accelerator, a compound capable of reducing the surface tension of an aqueous solution (aqueous ink composition) and elevating the penetration (wettability) of the aqueous solution into a recording medium is used. To speak specifically, a water-soluble organic solvent and/or a surfactant are used.

Examples of the water-soluble organic solvent include lower alcohols such as ethanol and propanol, Cellosolves such as ethylene glycol monomethyl ether and ethylene glycol monoethyl ether, carbitols such as diethylene glycol monomethyl ether and diethylene glycol monoethyl ether, and glycol ethers such as ethylene glycol mono-n-butyl ether, diethylene glycol-n-butyl ether and triethylene glycol-n-butyl ether. These are used individually or in combination of two or more thereof. Among these, glycol ethers are preferred because a high-quality recorded matter almost free of ink blurring can be provided.

Examples of the surfactants include anionic surfactants such as fatty acid salts and alkyl sulfates, nonionic surfactants such as polyoxyethylene alkylether and polyoxyethylene alkylphenylether, cationic surfactants and amphoteric surfactants. These are used individually or in combination of two or more thereof. Among these, nonionic surfactants are preferred because generation of bubbles (bubbling) in the ink can be prevented.

Specific preferred examples of the nonionic surfactant include Nissan Nonion K-211, K-220, P-213, E-215, E-220, S-215, S-220, HS-220, NS-212 and NS-220 (all are trade name, produced by JFO), and these are used individually or in combination of two or more thereof. In particular, acetylene glycol-base surfactants such as Surfynol 61, 82, 104, 440, 465 and 485 (all are trade name, produced by Air Product and Chemicals) are preferred. An ink having incorporated thereinto an acetylene glycol-base surfactant is suitable for ink jet recording because this ink is almost free of bubbling and excellent particularly in the ejection stability.

In the aqueous ink composition of the first invention, the penetration accelerator is preferably contained in an amount of 0.001 to 5% by weight, more preferably from 0.005 to 2% by weight. If the content is less than 0.001% by weight, the effect of accelerating ink penetration is not attained, whereas if it exceeds 5% by weight, the aqueous ink composition may decrease in the ejection stability.

The aqueous ink composition of the first invention may contain a moisture-retentive agent for more elevating the ejection stability. Examples of the moisture-retentive agent include polyols such as glycerol, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol and pentaerythritol, lactams such as 2-pyrrolidone, N-methyl-2-pyrrolidone and ε-caprolactam, ureas such as urea, thiourea, ethyleneurea and 1,3-dimethylimidazolizinone, and sugars such as multitol, sorbitol, gluconolactone and maltose. These are used individually or in combination of two or more thereof.

In the aqueous ink composition of the first invention, the moisture-retentive agent is preferably contained in an amount of 1 to 30% by weight, more preferably from 5 to 20% by weight.

From the same standpoint, the aqueous ink composition of the first invention may contain a fungicide or antiseptic. Examples of the fungicide and antiseptic include sodium benzoate, sodium pentachlorophenol, sodium 2-pyridinethiol-1-oxide, sodium sorbate, sodium dehydroacetate, 1,2-dibenzisothiazolin-3-one (Proxel CRL, Proxel BDN, Proxel GXL, Proxel XL-2 and Proxel TN, produced by AVECIA). These may be used individually or in combination of two or more thereof.

In the aqueous ink composition of the first invention, the fungicide or antiseptic is preferably contained in an amount of 0.001 to 3% by weight, more preferably from 0.01 to 1% by weight.

The aqueous ink composition of the first invention may further contain, if desired, additives such as viscosity-controlling agent, antioxidant, ultraviolet absorber, chelating agent and oxygen absorbent. These are used individually or in combination of two or more thereof.

In order to provide a good recorded matter having no blurring, the aqueous ink composition of the first invention preferably has a penetration property such that the penetration time is less than 1 second when the amount coated on a recording medium is 1 mg/cm$^2$. The penetration property such that "the penetration time is less than 1 second when the amount coated on a recording medium is 1 mg/cm$^2$" as used herein means a penetration property of the aqueous ink composition such that the time period immediately after 50 ng of aqueous ink composition is coated on a recording medium to a coated area of 360 dpi (dot/inch)×360 dpi until the coated surface is not stained with the aqueous ink composition even if the coated surface is touched, is less than 1 second. At this time, the recording medium used is neutral plain paper (for example, "XEROX-P", trade name, produced by Fuji Xerox).

Such a penetration property can be imparted by incorporating the penetration accelerator in the above-described predetermined amount into the aqueous ink composition.

From the same standpoint, the aqueous ink composition of the first invention preferably has a surface tension of less than 40 mN/m, more preferably 35 mN/m. The surface tension is measured according to JIS K3362-1978.

The surface tension can be controlled by incorporating the penetration accelerator in the above-described predetermined amount into the aqueous ink composition.

In view of the ejection stability, the aqueous ink composition of the first invention preferably has a viscosity at 25° C. of 1 to 25 mPa·S, more preferably from 1 to 15 mPa·S. The viscosity is measured according to JIS Z8803-1991.

The viscosity can be controlled by incorporating a viscosity-controlling agent into the aqueous ink composition, such as rosins, alginic acids, polyvinyl alcohol, hydroxypropyl cellulose, carboxymethyl cellulose, hydroxyethyl cellulose, methyl cellulose, polyacrylate, polyvinylpyrrolidone and gum arabi starch.

From the standpoint of improving the printing density and the liquid stability, the aqueous ink composition of the first invention preferably has a pH of 6 to 10, more preferably from 7 to 9.5.

The pH can be controlled by incorporating the organic amine compound represented by formula (A) or (B), which is an alkali agent, into the aqueous ink composition in the above-described predetermined amount.

The aqueous ink composition of the first invention can be prepared similarly to conventional inks using a conventionally known apparatus such as ball mill, sand mill, attritor, basket mill and roll mill. In the preparation, coarse particles are preferably removed for preventing clogging of nozzles. The coarse particles are removed, for example, by filtering an ink obtained by mixing the above-described components, through a filter such as membrane filter or mesh filter, and thereby removing particles preferably having a particle size of 10 µm or more, more preferably 5 µm or more.

The aqueous ink composition of the first invention can be suitably used in any method as long as it is a recording method of performing the printing by attaching an aqueous ink composition to a recording medium. Examples of such a recording method include an ink jet recording method of performing the printing by ejecting aqueous ink composition droplets and attaching the droplets to a recording medium, a recording method using a writing tool such as pen, and other various printing methods. The aqueous ink composition of the first invention is preferably used for an ink jet recording method, more preferably an on-demand type ink jet recording method. Examples of the on-demand type ink jet recording method include a piezoelectric element recording method of performing the recording using a piezoelectric element disposed on a printer head, and a thermal jet recording method of performing the recording using a heat energy from a heater or the like of an exothermic resistant element disposed on a printer head. The aqueous ink composition of the first invention can be suitably used for any ink jet recording method.

The aqueous ink composition of the first invention is excellent in the ejection stability by virtue of the action of the organic amine compound represented by formula (A) or (B) and since the above-described surface-modified pigment containing no dispersant is used, almost free of bubbling as compared with a normal ink containing a dispersant. Therefore, the aqueous ink composition of the first invention is very excellent in the ejection stability and on use as an ink for ink jet recording, freed from fear of nozzle clogging. Furthermore, the aqueous ink composition of the first invention contains no dispersant and therefore, the handling thereof is facilitated as compared with a normal pigment ink containing a dispersant, for example, the pigment content can be increased to a level of ensuring a sufficiently high printing density. Furthermore, the aqueous ink composition of the first invention, into which the penetration accelerator is incorporated, can provide a high-quality recorded matter almost free of ink blurring, has no fear of bleeding on use for multi-color printing and is broadened in the range of recording mediums to which the ink composition can be applied.

The aqueous ink composition of the second invention is described in detail below.

The aqueous ink composition of the second invention contains a pigment, a dispersant, an organic amine compound represented by formula (A) or (B), a penetration accelerator and water as essential components.

The pigment contained in the aqueous ink composition of the second invention is the same as the starting material of the surface-modified pigment in the aqueous ink composition of the first invention.

In view of storage stability of ink or for preventing clogging of nozzles, the pigment preferably has an average particle size of 1 to 300 nm, more preferably from 10 to 200 nm.

In the aqueous ink composition of the second invention, the pigment is preferably contained in an amount of 1 to 30% by weight, more preferably from 3 to 10% by weight. If the content is less than 1% by weight, the printing density is insufficient, whereas if it exceeds 30% by weight, increase in viscosity or on use as an ink for ink jet recording, clogging of nozzles may occur.

For the dispersant contained in the aqueous ink composition of the second invention, those used in this type of aqueous pigment ink may be used without any particular limitation. Specific examples thereof include water-soluble surfactants such as anionic surfactants (e.g., higher fatty acid salt and higher alcohol sulfate), cationic surfactants (e.g., aliphatic amine salt and phosphonium salt) and nonionic surfactants (e.g., fatty acid ester of polyoxyethylene compound), proteins such as gelatin and casein, natural rubbers such as gum arabi, glucoxide such as saponin, cellulose derivatives such as methyl cellulose, carboxymethyl cellulose and hydroxymethyl cellulose, natural polymers such as lignin sulfonate and shellac, anionic polymers such as polyacrylate, styrene-acrylic acid copolymer salt, vinyl naphthalene-acrylic acid copolymer salt, styrene-maleic acid copolymer salt, vinyl naphthalene-maleic acid copolymer salt, β-naphthalene-sulfonic acid formalin condensate salt and polyphosphoric acid, and nonionic polymers such as polyvinyl alcohol, polyvinyl pyrrolidone and polyethylene glycol. These are used individually or in combination of two or more thereof.

In view of solubility in an aqueous ink composition, the dispersant preferably has a weight average molecular weight of 100 to 50,000, more preferably from 200 to 40,000. If the molecular weight is less than 100, the printing is seriously uneven, whereas if it exceeds 50,000, the viscosity of ink greatly increases, as a result, the ink may not be used as an ink for ink jet recording or uniform solid printing may not be attained due to extreme aggregation of pigment particles on the recording medium.

In the aqueous ink composition of the second invention, the dispersant is preferably contained in an amount of 0.01 to 5% by weight, more preferably from 0.3 to 2% by weight. If the content is less than 0.01% by weight, no effect is provided on the dispersion stability of pigment, whereas if it exceeds 5% by weight, the viscosity (which is described layer) may not be easily adjusted to a value preferred as an ink for ink jet printing.

The organic amine compound represented by formula (A) or (B) contained in the aqueous ink composition of the second invention is an alkali agent used for adjusting the pH of the aqueous ink composition to a desired range (weak alkaline) and has a function of enhancing the ejection stability. This organic amine compound represented by formula (A) or (B) is the same as the organic amine compound in the aqueous ink composition of the first invention and the content thereof is also the same as in the first invention.

The penetration accelerator contained in the aqueous ink composition of the second invention is the same as the penetration accelerator in the aqueous ink composition of the first invention and the content thereof is also the same as in the first invention.

The water contained in the aqueous ink composition of the second invention is a main solvent. The water is the same as the water in the aqueous ink composition of the first invention and the content is also the same as in the first invention.

The aqueous ink composition of the second invention comprises these components (a pigment, a dispersant, an organic amine compound represented by formula (A) or (B), a penetration accelerator and water) and thereby, is enhanced in the ejection stability and penetration property into a recording medium, however, if desired, the aqueous ink composition may contain various components described below.

From the standpoint of more improving the ejection stability, the aqueous ink composition of the second invention may contain a moisture-retentive agent. The moisture-retentive agent is the same as the moisture-retentive agent in the aqueous ink composition of the first invention and the content thereof is also the same as in the first invention.

From the same standpoint, the aqueous ink composition of the second invention may contain a fungicide or antiseptic. The fungicide or antiseptic is the same as those in the aqueous ink composition of the first invention and the content thereof is also the same as in the first invention.

The aqueous ink composition of the second invention may contain, if desired, various additives the same as in the first invention.

From the standpoint of providing a good recorded matter reduced in blurring, the aqueous ink composition of the second invention preferably has a penetration property, similarly to the aqueous ink composition of the first invention, such that the penetration time is less than 1 second when the amount coated on a recording medium is 1 mg/cm$^2$.

Also, from the same standpoint, the aqueous ink composition of the second invention preferably has a surface tension of less than 40 mN/m, more preferably 35 mN/m, similarly to the aqueous ink composition of the first invention.

In view of the ejection stability, the aqueous ink composition of the second invention preferably has a viscosity at 25° C. of from 1 to 25 mPa·S, more preferably from 1 to 15 mPa·S, similarly to the aqueous ink composition of the first invention.

From the standpoint of improving the printing density and the liquid stability, the aqueous ink composition of the second invention preferably has a pH of 6 to 10, more preferably from 7 to 9.5, similarly to the aqueous ink composition of the first invention.

The aqueous ink composition of the second invention can be prepared in the same manner as conventional inks using a heretofore known apparatus, similarly to the aqueous ink composition of the first invention.

The aqueous ink composition of the second invention can be suitably used, similarly to the aqueous ink composition of the first invention, in any method as long as it is a recording method of performing the printing by attaching an aqueous ink composition to a recording medium. The recording method is the same as described above.

The aqueous ink composition of the second invention exhibits excellent ejection stability by virtue of the action of the organic amine compound represented by formula (A) or (B) and on use as an ink for ink jet recording, causes no clogging of nozzles. Furthermore, the aqueous ink composition of the second invention exhibits high penetration property into a recording medium by virtue of the action of the penetration accelerator, so that a short drying time can be attained, a high-quality recorded matter almost free of ink blurring can be provided and even on use for multi-color printing, fear of bleeding can be eliminated. In addition, a letter and/or an image can be formed even on a non-absorptive recording medium such as OHP sheet, needless to say about an absorptive recording medium such as paper.

EXAMPLES

The aqueous ink composition of the first invention will be illustrated in greater detail below with reference to the following Examples, but the first invention should not be construed as being limited thereto.

Examples A1 to A6 and Comparative Examples A1 to A3

Aqueous ink compositions each having a composition shown in Table 3 below were prepared. In the preparation, respective components were mixed at 25° C., stirred for 2 hours and then, filtered under pressure of 2 kg/cm$^2$ using a membrane filter having a pore size of 5 μm.

In Examples A1 to A6, organic amine compounds of Compound Nos. 1 to 6 were used, respectively, as the alkali agent. In Comparative Example 1, KOH was used. In Comparative Examples A2 and A3, Compound Nos. 7 and 8 shown below were used, respectively (both compounds are out of the scope of the first invention).

In any of Examples A1 to A6 and Comparative Examples A1 to A3, the pigment dispersion used is a surface-modified pigment dispersion of the type where a pigment is stably dispersed in an aqueous medium without using a dispersant. In Table 3 below, the amount of the pigment dispersion added is calculated in terms of the solid contents in the pigment.

TABLE 3

| | Example A | | | | | | Comparative Example A | | |
|---|---|---|---|---|---|---|---|---|---|
| | 1 | 2 | 3 | 4 | 5 | 6 | 1 | 2 | 3 |
| Pigment Dispersion | | | | | | | | | |
| CW1*1 | 4 | — | 4 | — | 4 | — | 4 | — | 4 |
| Cabojet 300*2 | — | 5 | — | 5 | — | 5 | — | 5 | — |
| Solvent | | | | | | | | | |
| Glycerol | 10 | 7 | 10 | 7 | 10 | 7 | 10 | 7 | 10 |
| Diethylene glycol | — | 4 | — | 4 | — | 4 | — | 4 | — |
| Alkali Agent | 0.8 | 1.0 | 0.8 | 1.2 | 0.6 | 0.8 | 0.4 | 1.0 | 0.8 |
| Kind of alkali Agent | Compound No. 1 | Compound No. 2 | Compound No. 3 | Compound No. 4 | Compound No. 5 | Compound No. 6 | KOH | Compound No. 7 | Compound No. 8 |
| Penetration Accelerator | | | | | | | | | |
| Isopropanol | — | — | 3 | 3 | 3 | 3 | — | 3 | 3 |
| Diethylene glycol mono-n-butyl ether | — | — | 5 | 5 | 5 | 5 | — | 5 | 5 |
| Surfynol 465 | — | — | — | — | 0.3 | 0.3 | — | — | 0.3 |
| Ion-Exchanged Water | bal. | bal. | bal. | bal. | bal. | bal. | bal. | bal. | bal. |

*1produced by Orient Kagaku Kogyo, *2produced by Cabot Specialty Chemicals Ink

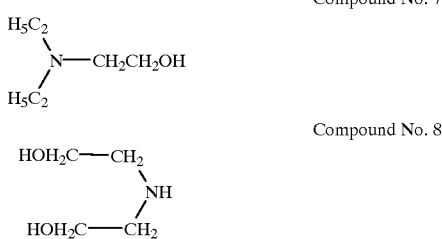

Compound No. 7

Compound No. 8

Evaluation of Clogging Resistance

Each aqueous ink composition of Examples A1 to A6 and Comparative Examples A1 to A3 was evaluated according to the <Evaluation Method of Clogging Resistance> below. The results obtained are shown in Table 4 below.

Evaluation Method of Clogging Resistance

An aqueous ink composition was filled in a piezoelectric element-type ink jet recording apparatus ("MJ-930C", trade name, manufactured by Seiko Epson K.K.), printing was performed and stable ejection of the aqueous ink composition was confirmed. Thereafter, the ink jet recording apparatus in a state of the printing head part being disengaged from the home position was left standing for 4 weeks in an environment at a temperature of 50° C. and a relative humidity of 40%. After standing, the ink jet recording apparatus was transferred to an environment at room temperature and when the temperature was lowered to room temperature, the power source of the body was turned on and printing was again performed and the ejection state of the aqueous ink composition was observed with an eye. At this time, when the ejection was not stable, a cleaning operation of the predetermined head part of the ink jet recording apparatus was performed, how many times the cleaning operation of the head part was performed until the aqueous ink composition was stably ejected (reversion) was counted, and the clogging resistance was evaluated according to the following evaluation criteria.

Evaluation Criteria

A: The ejection after standing was extremely stable and a cleaning operation of the head part was not necessary.

B: The ejection after standing was unstable and the cleaning operation of head part had to be performed twice or less until the reversion.

C: The ejection after standing was unstable and the cleaning operation of head part had to be performed 3 to 5 times until the reversion.

D: The ejection after standing was unstable and even when the cleaning operation of head part was performed 6 times or more, the reversion could not be attained.

TABLE 4

| | | Clogging Resistance |
|---|---|---|
| Example A | 1 | A |
| | 2 | A |
| | 3 | A |
| | 4 | A |
| | 5 | A |
| | 6 | A |
| Comparative Example A | 1 | D |
| | 2 | C |
| | 3 | C |

As is apparent from the results in Table 4, the aqueous ink compositions of Examples A1 to A6, containing the organic amine compound presented by formula (A) or (B), each exhibited excellent clogging resistance. On the other hand, the aqueous ink compositions of Comparative Examples A1 to A3, containing no organic amine compound represented by formula (A) or (B), were inferior in the clogging resistance.

The aqueous ink compositions of Examples A3 to A6, containing a penetration accelerator, each provided a high-quality recorded matter reduced in blurring. Furthermore, the aqueous ink compositions of Examples A5 and A6, containing acetylene glycol-containing surfactant Surfynol 465 as a nonionic surfactant, were extremely reduced in the bubbling and facilitated in the handling.

The aqueous ink composition of the second invention will be illustrated in greater detail with reference to the following Examples, but the second invention should not be construed as being limited thereto.

Examples B1 to B6 and Comparative Examples B1 to B3

The aqueous ink compositions each having the composition shown in Table 5 below each was prepared in the same manner as in Examples of the first invention.

In Examples B1 to B6, organic amine compounds of Compound Nos. 1 to 6 used in Examples of the first invention were used, respectively, as the alkali agent. In Comparative Example B1, KOH was used. In Comparative Examples B2 and B3, Compound Nos. 7 and 8 used in Examples of the first invention were used, respectively (both compounds are out of the scope of the second invention).

In any of Examples B1 to B6 and Comparative Examples B1 to B3, the pigment dispersion used is a pigment dispersion of the type where a pigment is stably dispersed in an aqueous medium using a dispersant. In Table 5 below, the amount of the pigment dispersion added is calculated in terms of the solid contents in the pigment.

TABLE 5

|  | Example B | | | | | | Comparative Example B | | |
| --- | --- | --- | --- | --- | --- | --- | --- | --- | --- |
|  | 1 | 2 | 3 | 4 | 5 | 6 | 1 | 2 | 3 |
| Pigment Dispersion | | | | | | | | | |
| #0542*[1] | 4 | — | 4 | — | 4 | — | 4 | — | 4 |
| MC Blue 103*[2] | — | 5 | — | 5 | — | 5 | — | 5 | — |
| Solvent | | | | | | | | | |
| Glycerol | 10 | 7 | 10 | 7 | 10 | 7 | 10 | 7 | 10 |
| Diethylene glycol | — | 4 | — | 4 | — | 4 | — | 4 | — |
| Alkali Agent | 0.8 | 1.0 | 0.8 | 1.2 | 0.6 | 0.8 | 0.4 | 1.0 | 0.8 |
| Kind of Alkali Agent | Compound No. 1 | Compound No. 2 | Compound No. 3 | Compound No. 4 | Compound No. 5 | Compound No. 6 | KOH | Compound No. 7 | Compound No. 8 |
| Penetration Accelerator | | | | | | | | | |
| Isopropanol | 3 | 3 | 3 | 3 | 3 | 3 | 3 | 3 | 3 |
| Diethylene glycol mono-n-butyl ether | — | — | 5 | 5 | 5 | 5 | — | 5 | 5 |
| Surfynol 465 | — | — | — | — | 0.3 | 0.3 | — | — | 0.3 |
| Ion-Exchanged Water | bal. | bal. | bal. | bal. | bal. | bal. | bal. | bal. | bal. |

*[1]produced by Orient Kagaku Kogyo, *[2]produced by Cabot Specialty Chemicals Ink

Evaluation of Clogging Resistance

Each aqueous ink composition of Examples B1 to B6 and Comparative Examples B1 to B3 was evaluated according to the "Evaluation Method of Clogging Resistance" in the same manner as in Examples of the first invention. The results obtained are shown in Table 6 below.

TABLE 6

|  |  | Clogging Resistance |
| --- | --- | --- |
| Example B | 1 | A |
|  | 2 | A |
|  | 3 | A |
|  | 4 | A |
|  | 5 | A |
|  | 6 | A |
| Comparative Example B | 1 | D |
|  | 2 | C |
|  | 3 | C |

As is apparent from the results in Table 6, the aqueous ink compositions of Examples B1 to B6, containing the organic amine compound represented by formula (A) or (B), each exhibited excellent clogging resistance. On the other hand, the aqueous ink compositions of Comparative Examples B1 to B3, containing no organic amine compound represented by formula (A) or (B), were inferior in the clogging resistance.

The aqueous ink compositions of Examples B1 to B6, containing a penetration accelerator, each provided a high-quality recorded matter reduced in blurring. Furthermore, the aqueous ink compositions of Examples B5 and B6, containing acetylene glycol-containing surfactant Surfynol 465 as a nonionic surfactant, were extremely reduced in the bubbling and facilitated in the handling.

The first invention includes the following embodiments (1) to (8) and (17) to (19).

The second invention includes the following embodiments (9) to (19).

(1) The aqueous ink composition according to the first invention, which comprises a water-soluble organic solvent and/or a surfactant as a penetration accelerator.

(2) The aqueous ink composition which comprises a glycol ether (water-soluble organic solvent) as a penetration accelerator.

(3) The aqueous ink composition which comprises a nonionic surfactant as a penetration accelerator.

(4) The aqueous ink composition which comprises an acetylene glycol-containing surfactant (nonionic surfactant) as a penetration accelerator.

(5) The aqueous ink composition wherein the aqueous ink composition contains a penetration accelerator and the penetration time is less than 1 second when the recording medium is neutral plain paper and the amount of the aqueous ink composition coated on the recording medium is 1 mg/cm$^2$.

(6) The aqueous ink composition wherein the aqueous ink composition contains a penetration accelerator and the surface tension is less than 40 mN/m.

(7) The aqueous ink composition which is used for an ink jet recording method.

(8) The aqueous ink composition which is used for an on-demand type ink jet recording method.

(9) The aqueous ink composition according to the second invention, wherein the penetration accelerator is a water-soluble organic solvent and/or a surfactant.

(10) The aqueous ink composition which comprises a glycol either (water-soluble organic solvent) as the penetration accelerator.

(11) The aqueous ink composition which comprises a nonionic surfactant as the penetration accelerator.

(12) The aqueous ink composition which comprises a acetylene glycol-containing surfactant (nonionic surfactant) as the penetration accelerator.

(13) The aqueous ink composition wherein the penetration time is less than 1 second when the recording medium is neutral plain paper and the amount of the aqueous ink composition coated on a recording medium is 1 mg/cm$^2$.

(14) The aqueous ink composition wherein the surface tension is less than 40 mN/m.

(15) The aqueous ink composition which is used for an ink jet recording method.

(16) The aqueous ink composition which is used for an on-demand type ink jet recording method.

(17) A recording method comprising performing printing by attaching an aqueous ink composition according to the first invention or the second invention to a recording medium.

(18) An ink jet recording method comprising performing printing by ejecting a liquid droplet of an aqueous ink composition according to the first invention or the second invention to attach the liquid droplet to a recording medium.

(19) A recorded matter obtained by performing recording according to a recording method using an aqueous ink composition of the first invention or the second invention.

While the present invention has been described in detail and with reference to specific examples thereof, it will be apparent to one skilled in the art that various changes and modifications can be made therein without departing from the spirit and scope thereof.

What is claimed is:

1. An aqueous ink composition comprising at least:

a surface-modified pigment capable of at least one of dispersing and dissolving in an aqueous solvent without use of a dispersant;

an organic amine compound represented by formula (A) or (B) shown below: a penetration accelerator comprising at least a surfactant; and water,

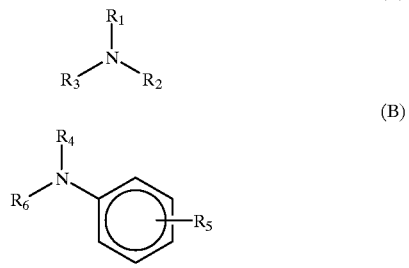

wherein $R_1$ to $R_6$ each independently represents a hydrogen atom or an alkyl or hydroxyalkyl chain having from 1 to 8 carbon atoms, which may have a branch, provided that at least one of $R_1$ to $R_3$ is an alkyl or hydroxyalkyl chain having from 3 to 8 carbon atoms, which may have a branch.

2. The aqueous ink composition according to claim 1, which contains said surface-modified pigment in an amount of 1 to 30% by weight and said organic amine compound represented by formula (A) or (B) in an amount of 001 to 5% by weight.

3. The aqueous ink composition of claim 1, wherein said surface-modified pigment comprises a pigment having, bonded to a surface thereof, at least one of a hydrophilic functional group and a salt thereof.

4. The aqueous ink composition according to claim 3, wherein said hydrophilic functional group is one or more members selected from the group consisting of a carboxylic group, a carbonyl group, a hydroxyl group, a sulfone group, a phosphoric acid group and a quaternary ammonium salt.

5. The aqueous ink composition according to claim 1, wherein the penetration accelerator is present in the ink composition in an amount of 0.001 to 5% by weight.

6. An aqueous ink composition comprising at least a pigment, a dispersant, an organic amine compound represented by formula (A) or (B) shown below, a penetration accelerator comprising at least a surfactant and water,

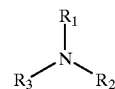

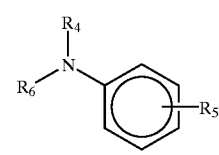

wherein $R_1$ to $R_6$ each independently represents a hydrogen atom or an alkyl or hydroxyalkyl chain having from 1 to 8 carbon atoms, which may have a branch, provided that at least one of $R_1$ to $R_3$ is an alkyl or hydroxyalkyl chain having from 3 to 8 carbon atoms, which may have a branch.

7. The aqueous ink composition according to claim 6, which contains said pigment in an amount of 1 to 30% by weight, said dispersant in an amount of 0.01 to 5% by weight, said organic amine compound represented by formula (A) or (B) in an amount of 0.01 to 5% by weight and said penetration accelerator in an amount of 0.0001 to 5% by weight.

8. The aqueous ink composition according to claim 1, wherein the penetration accelerator further comprises an organic solvent.

9. The aqueous ink composition according to claim 6, wherein the penetration accelerator further comprises an organic solvent.

* * * * *